US006532004B1

(12) United States Patent
Harrison et al.

(10) Patent No.: US 6,532,004 B1
(45) Date of Patent: Mar. 11, 2003

(54) APPLIANCES WITH MULTIPLE MODES OF OPERATION

(75) Inventors: Robert G. Harrison, Seattle, WA (US);
Robert D. Lamson, Seattle, WA (US)

(73) Assignee: Icebox, LLC, Lake Forest, IL (US)

( * ) Notice: Subject to any disclaimer, the term of this patent is extended or adjusted under 35 U.S.C. 154(b) by 0 days.

(21) Appl. No.: 09/479,274

(22) Filed: Jan. 5, 2000

Related U.S. Application Data

(60) Provisional application No. 60/115,197, filed on Jan. 6, 1999.

(51) Int. Cl.[7] ................................. G09G 5/00
(52) U.S. Cl. ................... 345/169; 348/552; 348/553; 709/223
(58) Field of Search ................. 345/158, 161, 345/167, 168, 169, 173, 10, 552, 773, 839; 348/552, 553, 838, 61, 554, 836, 839, 460, 473, 584; 709/203, 217, 219, 223

(56) References Cited

U.S. PATENT DOCUMENTS

| | | | |
|---|---|---|---|
| 5,396,546 A | | 3/1995 | Remillard |
| 5,724,102 A | | 3/1998 | Harrison et al. |
| 5,724,106 A | * | 3/1998 | Autry et al. ............ 348/734 |
| 5,727,159 A | | 3/1998 | Kikinis |
| 5,801,784 A | | 9/1998 | Harrison et al. |
| 5,828,370 A | * | 10/1998 | Moeller et al. ............ 345/328 |
| 5,854,624 A | * | 12/1998 | Grant ........................ 345/169 |
| 5,905,251 A | | 5/1999 | Knowles |
| 5,929,849 A | * | 7/1999 | Kikinis ..................... 345/327 |
| 5,938,726 A | | 8/1999 | Reber et al. |
| 5,982,445 A | | 11/1999 | Eyer et al. |
| 6,012,112 A | * | 1/2000 | Brase et al. .................. 710/62 |
| 6,157,809 A | * | 12/2000 | Kambayashi .............. 455/5.1 |
| 6,181,326 B1 | * | 1/2001 | Takahashi ................... 345/158 |
| 6,215,420 B1 | | 4/2001 | Harrison et al. |

OTHER PUBLICATIONS

Tarr, Greg; CMi Enters Convergence Through The Kitchen; Jan. 25, 1999.

* cited by examiner

Primary Examiner—Bipin Shalwala
Assistant Examiner—Mansour M. Said
(74) Attorney, Agent, or Firm—Sonnenschein Nath & Rosenthal

(57) ABSTRACT

The combination of an appliance with an INTERNET mode of operation which is capable of being connected to the Internet and of displaying a web page with at least one link identified by a number. Access to the corresponding links is accomplished through an input device having a user-actuatable control with a number corresponding to each link on the web page.

16 Claims, 16 Drawing Sheets

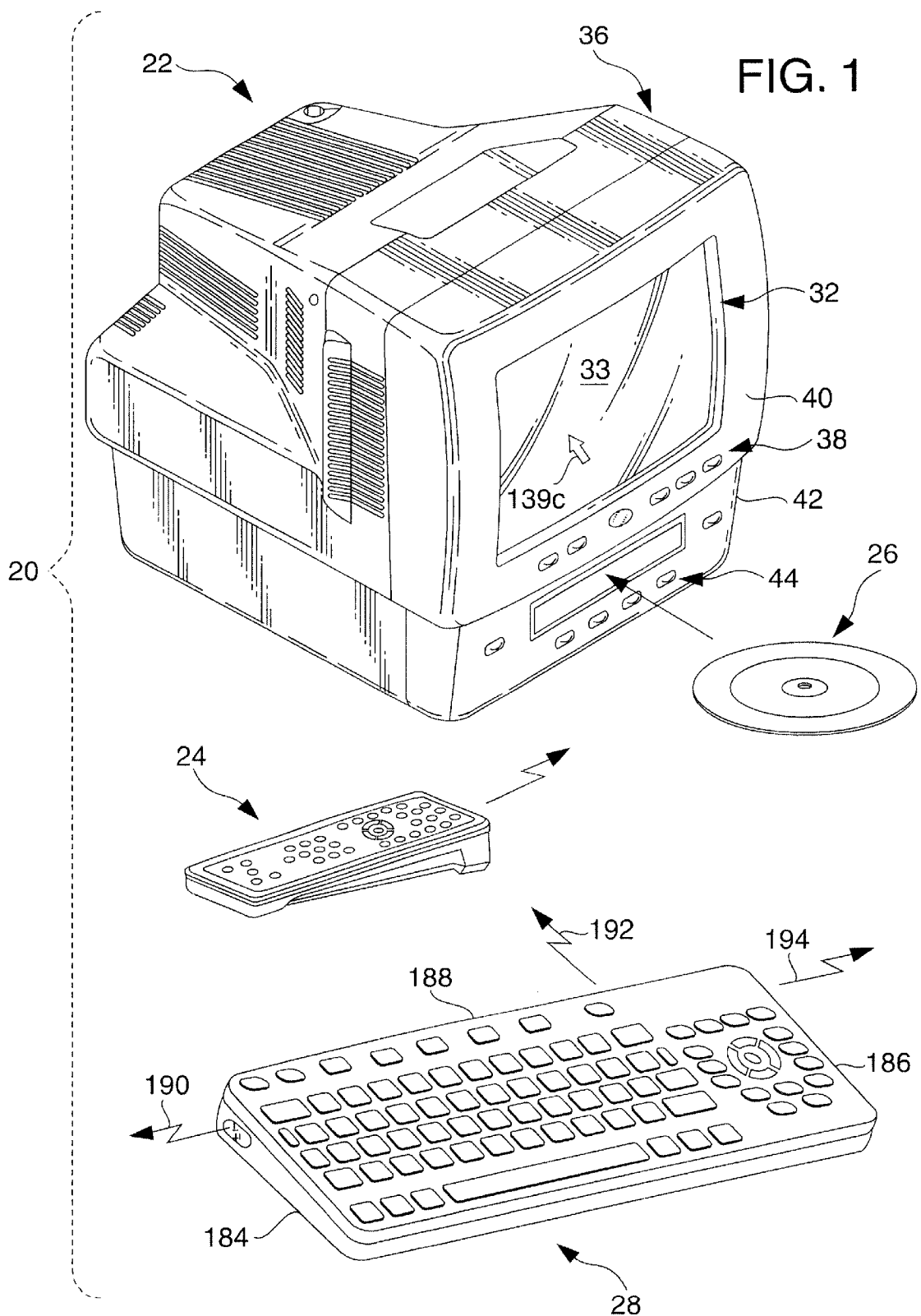

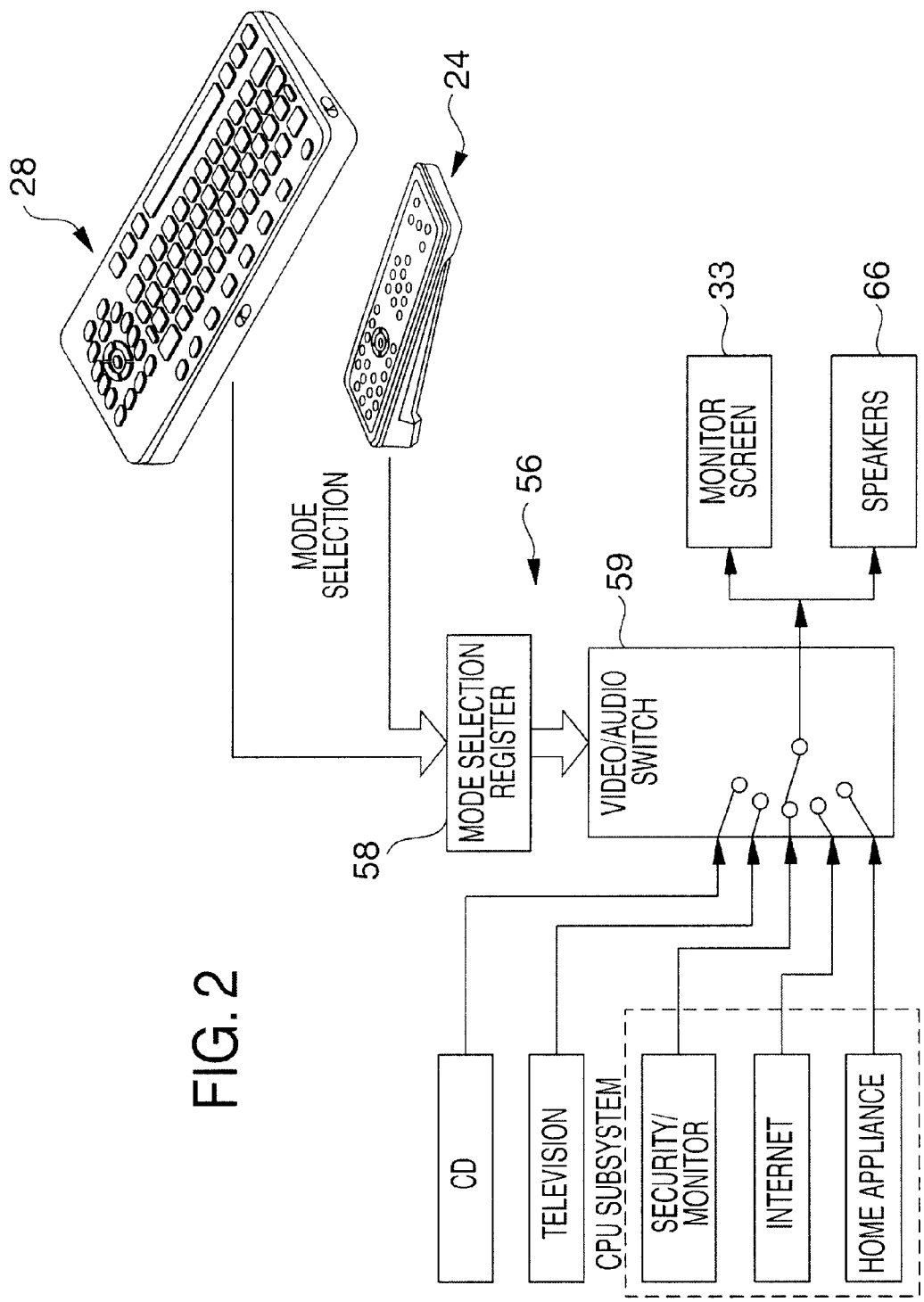

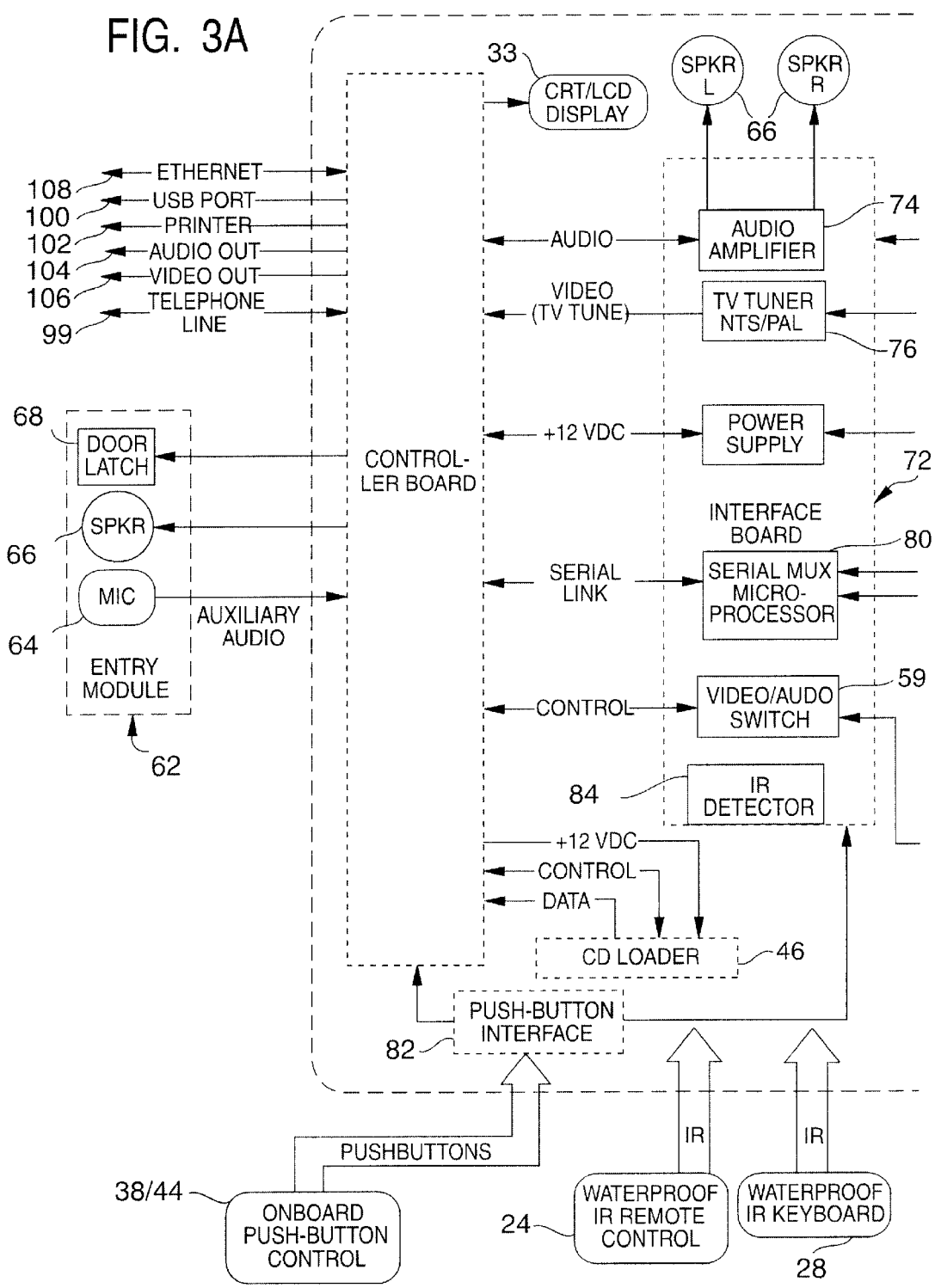

APPLIANCES WITH MULTIPLE MODES OF OPERATION

CROSS REFERENCE TO RELATED APPLICATIONS

This application is related to and claims the benefit of the filing date of U.S. provisional application No. 60/115,197 filed Jan. 6, 1999, and the following identified U.S. patent applications, which are incorporated herein by reference:

U.S. patent application Ser. No. 09/465,671, entitled "Keyboard II," filed Dec. 17, 1999, which claims the benefit of U.S. patent application Ser. No. 09/466,103, entitled "Keyboard I," filed Dec. 17, 1999, which claims the benefit of U.S. Provisional Application No. 60/115,006, filed on Jan. 6, 1999, and U.S. patent application Ser. No. 09/116,785, entitled "Integrated Units With Diagnostic Capabilities," filed on Jul. 16, 1998;

U.S. patent application Ser. No. 09/116,785, entitled "Integrated Units With Diagnostic Capabilities," filed on Jul. 16, 1998, which claims the benefit of U.S. Provisional Application No. 60/052,703, filed on Jul. 16, 1997, and U.S. patent application Ser. No. 09/116,825, entitled "Integrated Units With Home Security and Monitoring Capabilities," filed on Jul. 16, 1998;

U.S. patent application Ser. No. 09/116,825, entitled "Integrated Units With Home Security and Monitoring Capabilities," filed on Jul. 16, 1998, which claims the benefit of U.S. patent application Ser. No. 09/046,947, entitled "Appliances With Internet Access," filed Mar. 23, 1998; and U.S. patent application Ser. No. 09/046,947, entitled "Appliances With Internet Access," filed Mar. 23, 1998, which claims the benefit of the following identified U.S. patent applications, which are also incorporated herein by reference:

U.S. patent application Ser. No. 08/707,623, entitled "Educational and Training Devices and Methods," filed on Sep. 5, 1996 and issued on Oct. 5, 1999 as U.S. Pat. No. 5,961,333;

U.S. patent application Ser. No. 08/641,911, entitled "Information Retrieval and Presentation Systems With Direct Access To Retrievable Items Of Information," filed on May 2, 1996 and issued on Mar. 12, 1998 as U.S. Pat. No. 5,751,369;

U.S. patent application Ser. No. 08/624,983, entitled "Operation of Information/Entertainment Centers," filed on Mar. 29, 1996 and issued on Jun. 9, 1998 as U.S. Pat. No. 5,764,304, which is a continuation-in-part of U.S. application Ser. No. 08/569,310 filed Dec. 8, 1995;

U.S. patent application Ser. No. 08/624,984, entitled "Data Storage Devices," filed on Mar. 29, 1996 and issued on Sep. 1, 1998 as U.S. Pat. No. 5,801,784, which is a continuation-in-part of U.S. application Ser. No. 08/569,310 filed Dec. 8, 1995;

U.S. patent application Ser. No. 08/625,719, entitled "Methods of Producing Data Storage Devices for Appliances," filed on Mar. 29, 1996 and issued on Apr. 27, 1999 as U.S. Pat. No. 5,898,462, which is a continuation-in-part of U.S. application Ser. No. 08/569,310 filed Dec. 8, 1995;

U.S. patent application Ser. No. 08/621,638, entitled "Systems In Which Information Can Be Retrieved From An Encoded Laser Readable Disc," filed on Mar. 26, 1996 and issued on Mar. 8, 1998 as U.S. Pat. No. 5,724,102, which is a divisional of U.S. patent application Ser. No. 08/569,310, filed Dec. 8, 1995; and U.S. patent application Ser. No. 08/569,310, entitled "Systems With A Remote Control In Which Information Can Be Retrieved From An Encoded Laser Readable Disc," filed Dec. 8, 1995 and issued on May 5, 1998 as U.S. Pat. No. 5,748,254, which is a continuation of U.S. patent application Ser. No. 08/505,969, filed Jul. 24, 1995, now abandoned.

TECHNICAL FIELD OF THE INVENTION

The present invention relates to novel appliances with multiple modes of operation.

BACKGROUND OF THE INVENTION

The above-identified related applications teach new and novel appliances capable of carrying out different ones of multiple functions. A function is called up by choosing the appropriate, user-selectable mode. Examples of the operating modes which different ones of the subject appliances have and the function of the appliance in each of these modes appear below.

| Mode | Function |
| --- | --- |
| TELEVISION | Allows the user to watch television |
| CD | Allows the user to play a conventional audio (on audio/visual) disk; in this mode the user can also play a disk of the character described in U.S. Pat. Nos. 5,724,102 and 5,801,784 to retrieve lessons on a particular subject or information on performing a task from the disk. |
| APPLIANCE | Gives the integrated module control over one or more appliances - as examples only, a kitchen range, refrigerator, central heating system, air conditioner, or central vacuuming system. Also, diagnostic information on the controlled appliance(s) may be gathered and made available on the display screen of the appliance and at a service or repair facility. |
| SECURITY | Allows one to visually identify and converse with a person at an entry way, and to unlock a door at the entry way, all from the location of the appliance; the appliance can also be used in this mode to monitor an area remote from the appliance - a baby's bedroom for example |

Appliances of the character described above with Internet capabilities are disclosed in copending U.S. patent application Ser. No. 09/046,947. In the INTERNET mode of operations a user can log onto and browse the Internet and send and receive e-mail messages.

SUMMARY OF THE INVENTION

Disclosed herein are certain new and novel appliances which have all five of the operating modes identified above. One or modes may be disabled to best fulfill the requirements of a particular market or other purposes.

In the INTERNET mode of operation, commands can be inputted to a integrated unit component of the module from a keyboard as well as from a remote control or onboard controls of the appliances disclosed herein. This has a number of advantages. For example, an e-mail message can be composed by typing characters on the keyboard instead of selecting the characters with an arrow and then clicking on the character, the approach employed in using a remote control as disclosed in the '947 application.

Another feature of the novel appliances disclosed herein is that links appearing on a web site page such as those disclosed in the '947 application can be selected by activating a remote control button or a number key on a keyboard. This simplifies Internet browsing which, in the appliances disclosed in the '947 application, require the user to move a cursor to the related link and click on the link.

Yet another significant advantage of the appliances disclosed herein is that transitions from one operating mode to another can be made almost instantaneously. This eliminates the distraction and frustration which a slower transition would cause.

Still another advantage of the appliance disclosed herein is that a user is returned to the point where operation in a mode is when the user exits from and then returns to a mode. This is particularly advantageous when the user would otherwise have to perform a number of steps to return to the first mode.

The objects, advantages, and important features of the present invention will be apparent to the reader from the foregoing and the appended claims and as the ensuing detailed description and discussion proceeds in conjunction with the accompanying drawings.

BRIEF DESCRIPTION OF THE DRAWINGS

FIG. 1 is a pictorial view showing the components of an appliance (or system) which has the capacity of operating in a user-selected one of plural operating modes and which is constructed in accord with, and embodies, the principles of the present invention;

FIG. 2 shows, diagrammatically, the inputs to which a video monitor and speakers of the FIG. 1 appliance are switched when different ones of the available operating modes are selected;

DETAILED DESCRIPTION OF THE INVENTION

Figure 3B:
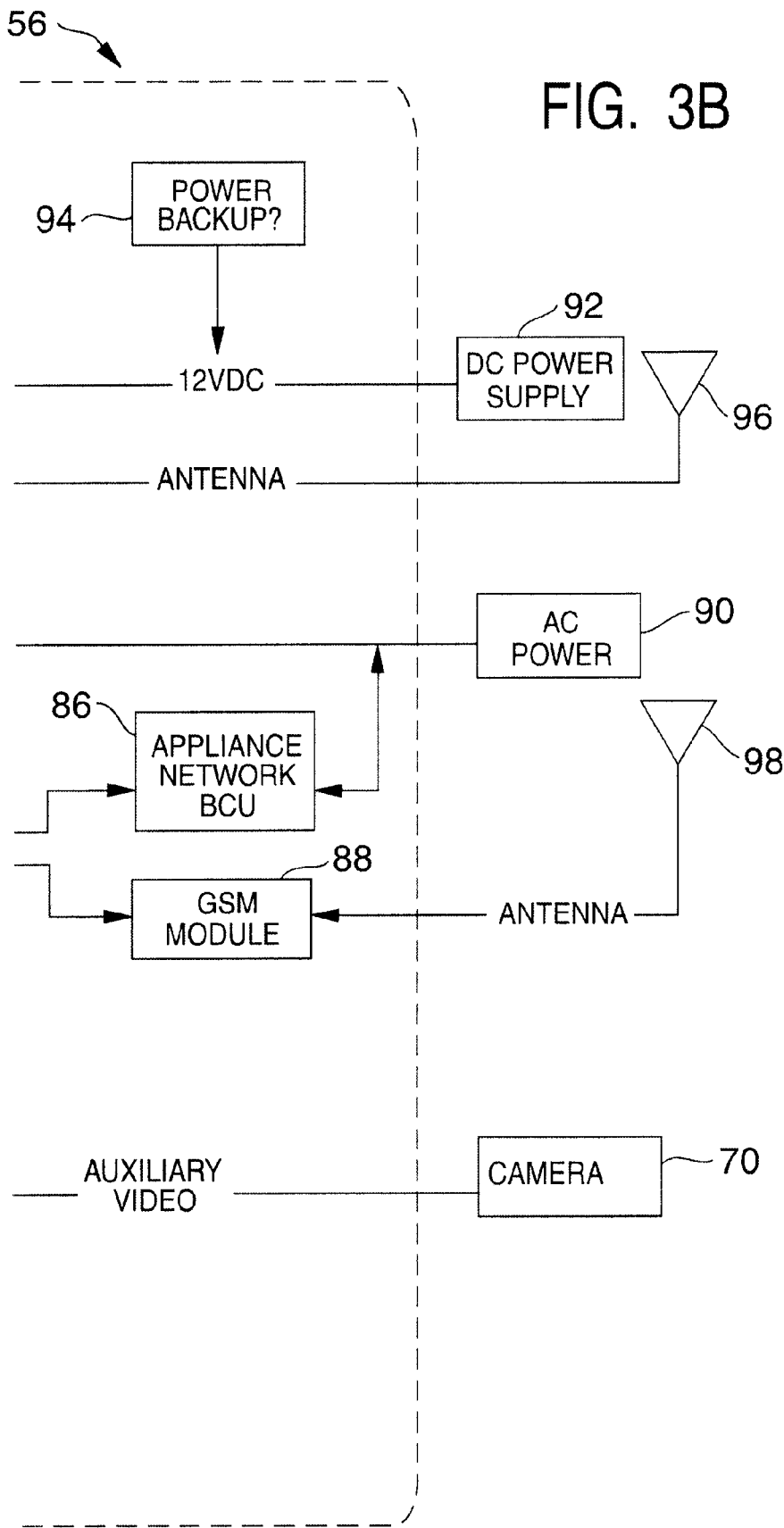
FIG. 3 shows the relationship between FIGS. 3A and 3B which, taken together and with FIG. 2, schematically depict the operating components of an integrated unit which is an element of the FIG. 1 appliance; this figure also shows other elements of the appliance as well as certain inputs to and elements controlled by the operating components of the integrated unit.

One currently representative and important application of the present invention is the provision of appliances which are designed for use in a kitchen. A system or appliance suitable for this (and other) applications of the invention is illustrated in FIG. 1 and identified by reference character 20.

TELEVISION
CD
INTERNET
APPLIANCE
SECURITY

How appliance 20 functions in each of these modes is described above in that section of this specification entitled SUMMARY OF THE INVENTION.

The major components of system 20 are: an integrated unit (or module) 22, a remote control 24, and a laser readable disk 26. As mentioned above, disk 26 may be a conventional CD or other optically readable disk from which an appliance user can retrieve information on an available task or subject. Examples only are Video 1.1, Video 2.0, DVD, and CDI disks.

The illustrated system 20 also has an optional keyboard 28. This keyboard is employed by a system user with system 20 in its INTERNET mode of operation in sending e-mail messages, to reach web sites which cannot be accessed by clicking on a link on a home page 30 (see FIG. 12) of controlled context, and to carry out other functions as described in copending application Ser. No. 09/465,671 filed Dec. 17, 1999.

Integrated unit 22 includes a television unit 32 which has a CRT (cathode ray tube) with a screen 33 (or a LED or other display) and a video compact disc player 34 (or other player for laser readable disk) both housed in the same cabinet 36. Conventional onboard controls 38 for television 32 are located on the front panel 40 and the right-hand side panel 42 of cabinet 36, and onboard controls 44 for the disc player 34 are also located on front cabinet panel 40. A conventional tray-type loader 46 (See FIG. 3A) is used to load disc 26 into player 34.

The operating components of integrated unit 22 and ancillary items activated in different operating modes of system 20 are depicted schematically in FIGS. 2, 3A, and 3B and collectively identified by reference character 56. These components include a mode selection register 58 and a video/audio switch 59, both activate when a particular one of the system 20 operating modes is selected to channel the input available in the selected mode to the screen 33 of system 20 and to speakers 60 of that system. As a single example, when the TELEVISION mode is selected, a connection to a source for a television signal such as an antenna, a cable, and/or a VCR is made through switch 59.

Other Components controlled by operating system 56, in this case, in the SECURITY mode of operation, are incorporated in an entry module identified by reference character 62 in FIG. 3A. These components include a microphone 64, a speaker 66, and an electrically operated door latch 68. Optionally located at the same entryway (not shown) as module 62 is a camera 70 which is designed to display an image of a person at the entryway on CRT screen 33. The operation of a system of the same character as the one disclosed herein is copending application Ser. No. 09/116, 285 filed Jul. 16, 1998.

Other major components of the complement 56 of operating components, located interface board 72, are listed below along with the function of each component.

| Reference Character | Component | Function |
|---|---|---|
| 73 | Controller Board | Includes a CPU (not shown) and other components which control the operation of appliance 20 |
| 74 | Audio Amplifier | Boosts the signal transmitted from controller board 61 to a level high enough to drive speakers 60 |
| 76 | TV Tuner | Like a conventional TV tuner |
| 78 | Power Supply | Converts AC power to (typically) 12 V DC for powering components of operating system 56 such as the components on controller board 61 |
| 80 | Serial Mux Microprocessor | Can route signals transmitted from controller board 62 to either appliance network BCU 86 or GSM module 84, eliminating the need for more than one serial port |
| 59 | Video Switch | Connects the involved components of interface board 72 to the input appropriate for each of the operating modes of appliance 20 |
| 82 | Pushbutton Interface | Operatively connects onboard controls 38 and 44 to controller board 73 |
| 84 | Infrared Detector | Receiver for IR signals transmitted from an input device such as remote control 24 on keyboard 28 |

Also included in, on operatively associated with interface board 72, are the following additional components:

| Reference Character | Component | Function |
|---|---|---|
| 86 | Appliance Network BCU | A filter and multiplexer which allows data to be transmitted and received over lines carrying AC power by multiplexing high frequency data signals with the AC signal to transmit data and by filtering out the AC component of multiplexed signals to the data |
| 88 | GSM Module | Connects to a local call to send and receive telephone messages - for example, to the APPLIANCE mode of appliance 20 to transmit messages to a service/repair facility as described in copending application No. 09/116,785 filed 16 July 1998 |
| 90 | AC Power Supply | Furnishes power to operating system 56 |
| 92 | DC Power Supply | Allows appliance 20 to be operated on DC power |
| 94 | Power Backup | Typically an onboard battery which allows appliance 20 to continue to operate if the external power source(s) fail |
| 96 | TV Antenna (may instead be a cable or other TV signed input - VCR, DVD, etc.) | Functions conventionally |
| 98 | GSM Antenna | Transmits and receives cell phone (GSM) signals |

It was pointed out above that appliance 20 can transmit and receive data via a telephone line and cell phone linkups. The telephone line is shown in FIG. 3A and identified by reference character 99.

As shown in FIG. 3A, system 20 also has a USB port 100 as well as links (or connections) (102, 104, and 106) for transmitting appropriately formatted data to a printer and to video and audio devices which are not components of the appliance.

Appliance 20 preferably also has an Ethernet port 108. This: (1) allows appliance 20 to be networked to compatible appliances and (2) allows the appliance to be connected to the Internet via DSL or other broad bandwidth link.

Figure 4:
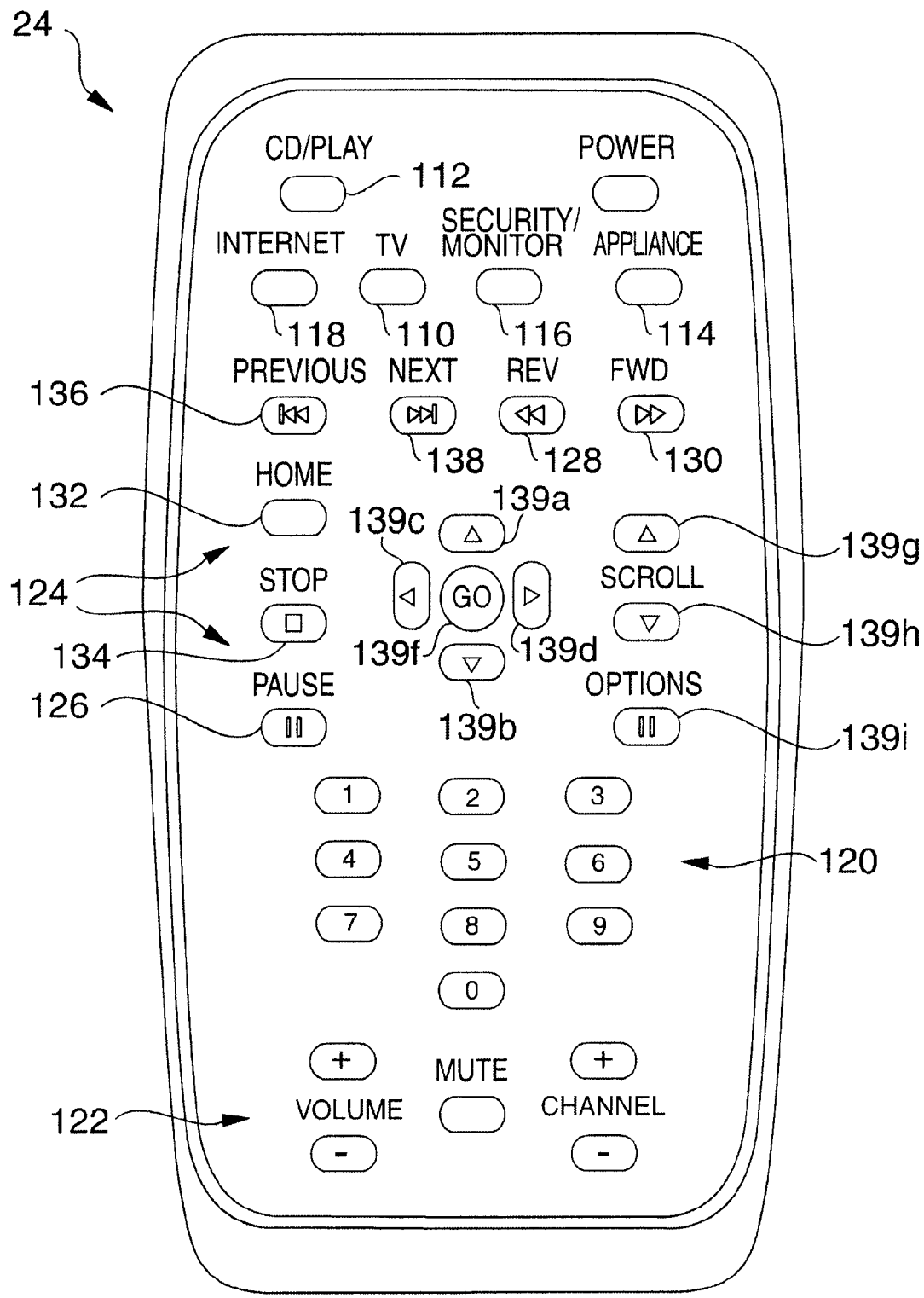
FIG. 4 is a plan view of the remote control; shown in FIG. 1; this remote control is a component of the exemplary FIG. 1 appliance.

The TELEVISION, CD, APPLIANCE, SECURITY/MONITOR, and INTERNET modes of operation may be selected by the user of system 20 with push button controls 110, 112, 114, 116, and 118 of remote control 24 (see FIG. 4).

Referring now especially FIG. 2, electronic video/audio switch 59 is shown in the interest of clarity. This switch has five positions labeled 1–5.

The pressing of one of the five mode switches 110, 112, 114, 116, or 118 causes a corresponding number—shown in the following table—to be placed in selection register 58.

| Mode | Number |
|---|---|
| CD | 1 |
| TELEVISION | 2 |
| SECURITY/MONITOR | 3 |
| INTERNET | 4 |
| APPLIANCE | 5 |

Video switch 59 is almost instantaneously set to the number in selection register 58, causing appliance 20 to operate in the selected mode.

This use of a mode selection register and a video/audio switch to make visual and audio information available to screen 32 and speakers 98 from the appropriate source in each of the five modes of operation of appliance 20 as shown in FIG. 2 is an important feature. This arrangement allows for almost instantaneous switching from one mode of operation to another, which is important to the appliance user who would typically be frustrated if an appreciable amount of time were required to switch from one operating mode to another.

Remote control 24 also has a numerical keypad 120 with push buttons ①  through ⑥ and two groups of push buttons respectively identified by reference characters 122 and 124. The push buttons of group 122 are employed in the TELEVISION mode of operation. They function in the same manner as the similar designated controls of a conventional television set. The PAUSE, REV, and FWD buttons 126, 128, and 130 of group 124 are employed in the CD mode of operation in the same manner as their conventional CD player counterparts.

Considering then buttons in group 124, HOME button 132 returns the system user to the beginning of a disk and thus to the beginning of its content in the CD mode of operation for system 20. In the INTERNET mode of operation, this button returns the user to a home page such as the one identified by reference character 30 in FIG. 12.

STOP button 134 is employed in the same manner as its conventional counterpart in the CD mode of operation. In the INTERNET mode of operation, this button is used to stop an operation in progress—for example, the downloading of a file from the Internet.

PREVIOUS and NEXT buttons 136 and 138 are used in the CD mode of operation for the purposes described in the '947 application; and the remaining buttons in group 124 are employed in the INTERNET mode of operation, again for the purposes described in the '947 application.

UP, DOWN, LEFT, and RIGHT buttons 139*a* . . . *d* are used with appliance 20 in its INTERNET mode of operation to move a cursor 139*e* (see FIG. 1) around screen 33. GO button 139*f* is pressed to "click on" and select an option reached by cursor 139*e*. Also available with appliance 20 in its INTERNET mode of operation are SCROLL UP and SCROLL DOWN buttons 139g and 139h and OPTIONS button 139i. The SCROLL UP and SCROLL DOWN buttons are employed if a page of information is too large to fit on screen 33. These buttons allow the appliance user to move the page up (or down) to bring the wanted part of the page into view on screen 33.

Figure 4A:
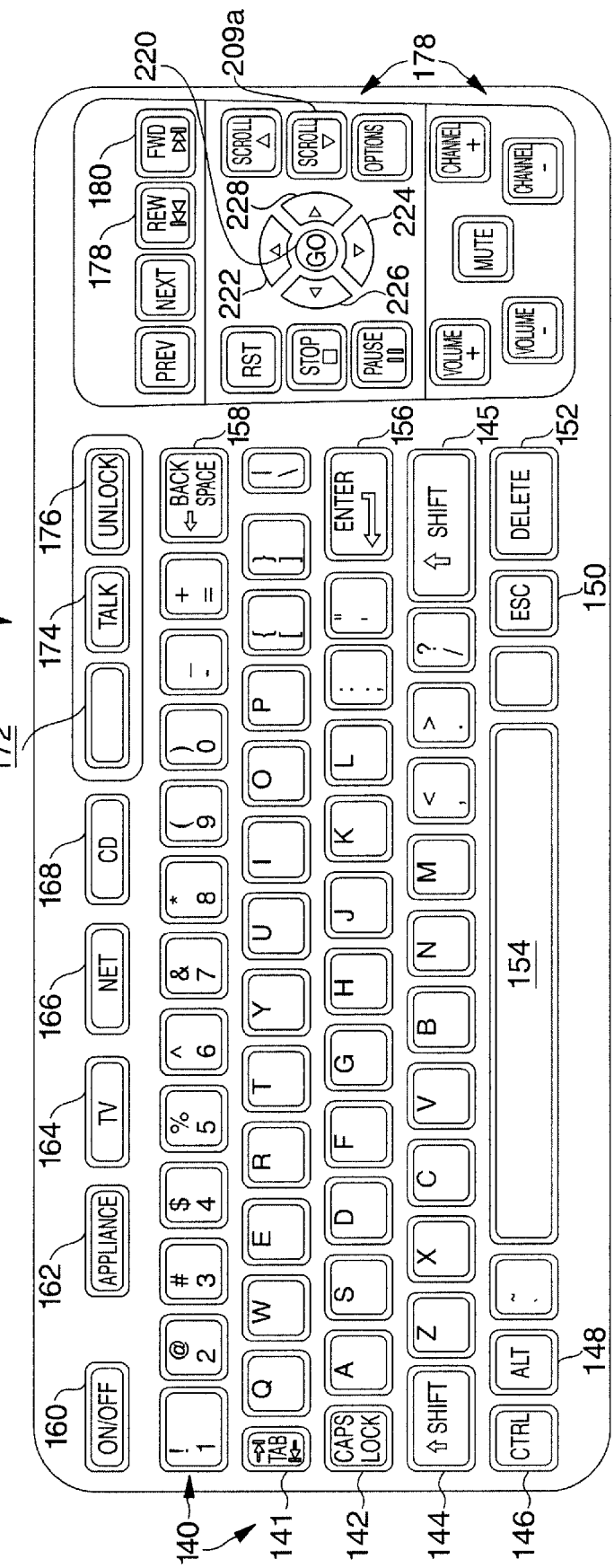
FIG. 4A is a plan view of a keyboard; this keyboard is a component of the FIG. 1 appliance.

Keyboard 28 (see FIGS. 1 and 4A) has both character and function keys. The character keys—collectively identified by reference character 140—may be those constituting a conventional QWERTY key set. The function keys include conventional Tab, Caps Lock, Shift, Control, Alt, Escape, Delete, Space, Enter, and Backspace keys 141 . . . 158 as well as an On/Off key 160. Additional function keys of the illustrated, exemplary keyboard 28 include mode switches (or buttons) APPLIANCE, TELEVISION (TV), INTERNET (NET), and buttons 162 . . . 168 and a key block 170 which includes security monitor, talk, and unlock buttons 172, 174, and 176. Mode keys 162 . . . 168 are employed to operate appliance 20 in a selected one of its APPLIANCE, TV, INTERNET, and CD modes. The talk and unlock buttons 172 . . . 176 in set 170 are employed with appliance 20 in its SECURITY/MONITOR mode of operation to talk to a person at the entryway and to unlock a door at the entryway. Specifically, pressing button ① on remote control keypad 120 or the like numbered button on keyboard 28 (on a like numbered onboard control) allows the appliance user to talk to a person (or persons) at the entryway. Pressing button ② disengages lock 68 (FIG. 2), allows the person or persons at the entryway to enter.

This just described mode of operation of appliance 20 is entered when the door bell rings.

Pressing SECURITY/MONITOR mode switch 172 turns on a camera in a monitored area—for example, an entryway or a baby's nursery. Operation of an appliance of the character disclosed herein in a SECURITY/MONITOR mode is described in detail in copending application Ser. No. 09/115,825.

Keyboard 28 also has a number of other function keys collectively identified by reference character 178. These keys are labeled and they have the same functions as the like number buttons on remote control 24.

When a character or function key on keyboard 28 is pressed, a coded electrical signal unique to the selected character or function is generated and converted to a correspondingly coded IR signal which is transmitted to appliance module 22. The IR signals are generated by LED's mounted at the two end walls 184 and 186 and the back wall 188 of the keyboard. These LED's are represented in FIG. 1 by arrows 190, 192, and 194. Consequently, and because the signals are in the IR range, a usable signal will be transmitted to appliance 20 essentially without regard to the angle through which keyboard 28 might be rotated relative to the infrared radiation receiver 84 of the appliance 20.

Keyboards of the character described above are disclosed in copending provisional patent application No. 60/115,006 filed Jan. 6, 1999 and in copending patent application Ser. No. 09/465,671 filed Dec. 17, 1999.

It was pointed out above that appliance 20 may be used in its CD mode to retrieve information from a laser readable disk. Specifically, remote control 24 (or keyboard 28) is employed to navigate through a hierarchical array of menus written to the disk to retrieve information on a selected subject or task from compact disc 26 and to display that information on the screen 33 of integrated unit 22.

Appliance 20 can be configured to display either an introductory video 203 or a top level menu 204 when the CD mode of operation of appliance 20 is selected. Information is reached by making choices.

Specifically, Appliance 20 may be programmed to bring up either an introductory video 203 or a top level menu 204 when the CD mode of appliance 20 is selected. In either case, the appliance user selects a numbered choice from the top level menu, bringing up a second level menu, 206, also with numbered choices. This process is continued until the information of interest—typically in the form of a video clip—is reached and displayed on screen 33.

Figure 6:
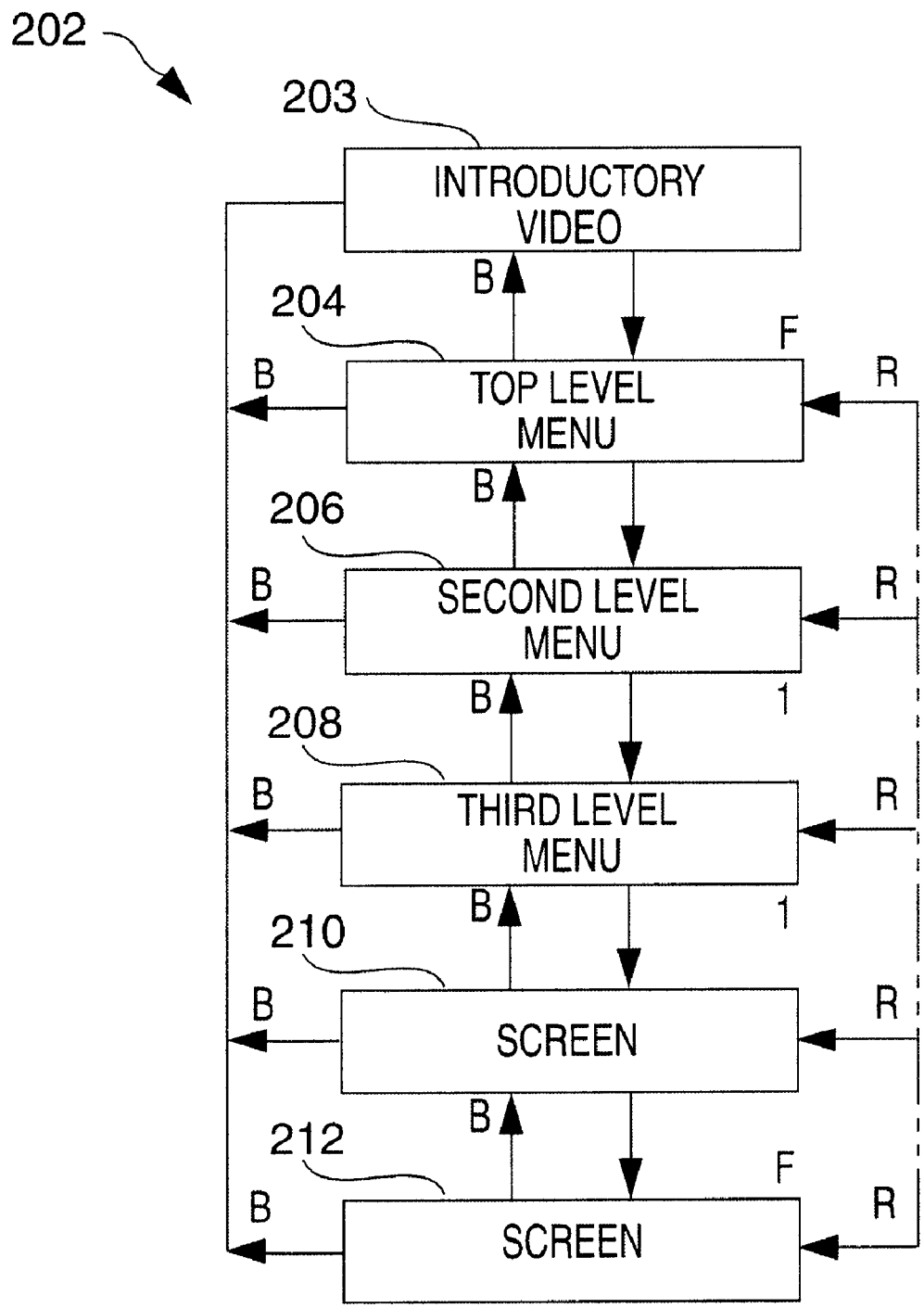
FIG. 6 shows, diagrammatically, a representative navigational chart which includes an introductory video and a hierarchy of menus that can be quickly and easily navigated by a user of the FIG. 1 system to reach information of interest stored on a laser readable disk component of that system.
Figure 9:
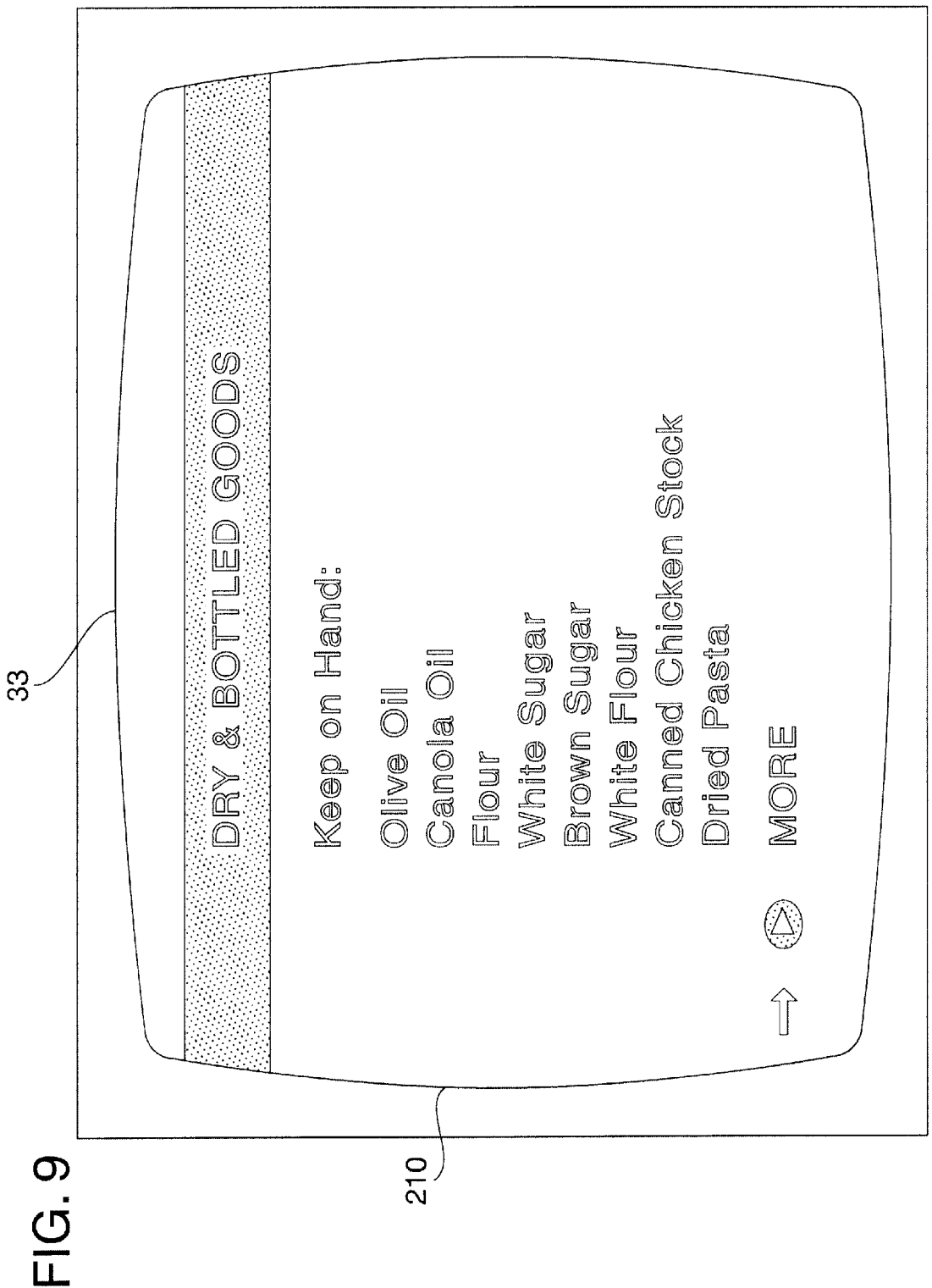
Figure 10:
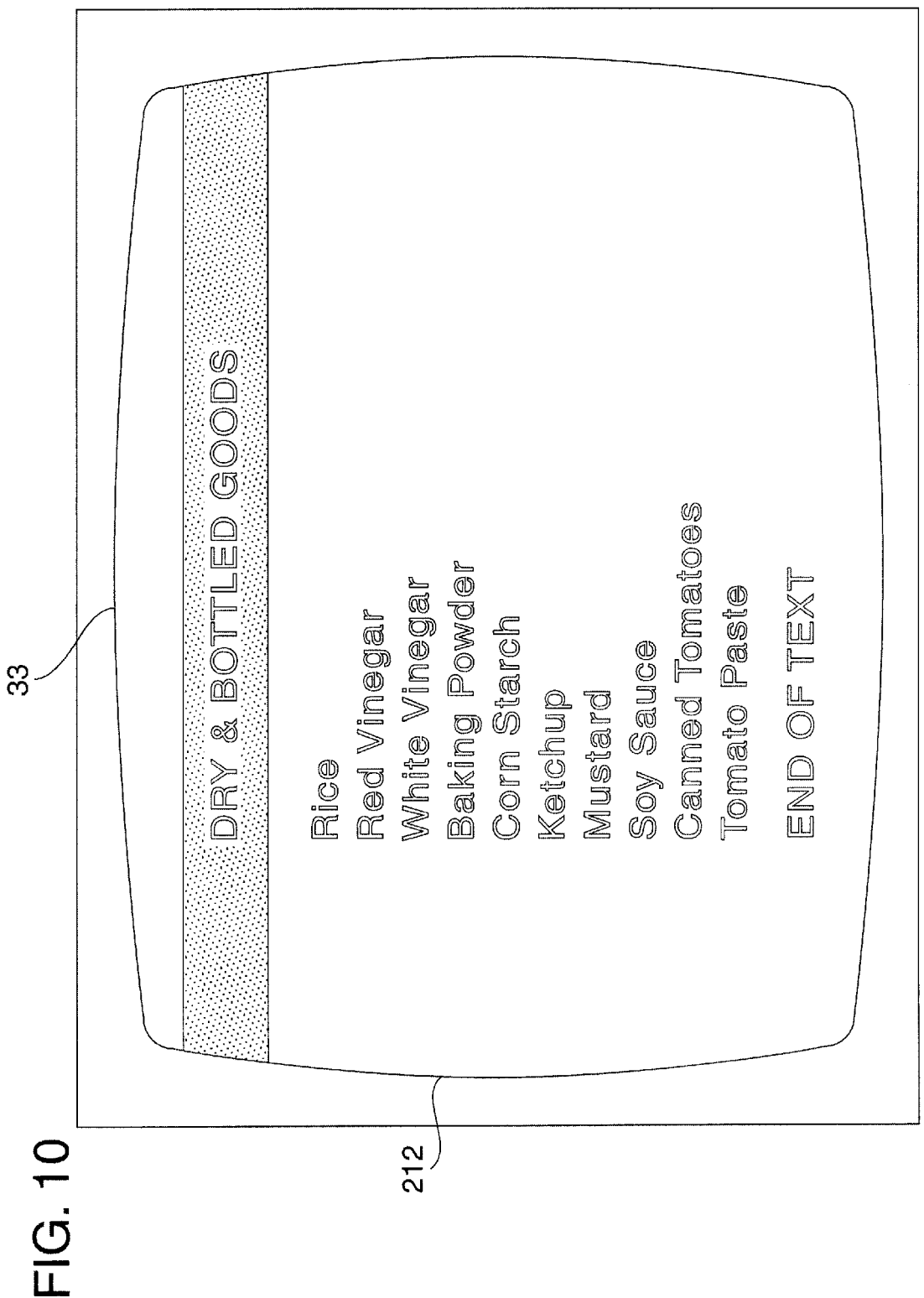

In the representative scenario depicted in FIG. 6, the appliance user can navigate from top level menu 204 downwardly through second level menu 206 and a third level menu 208 to reach information of interest (screens 210 in FIG. 9 and 212 in FIG. 10).

Figure 7:
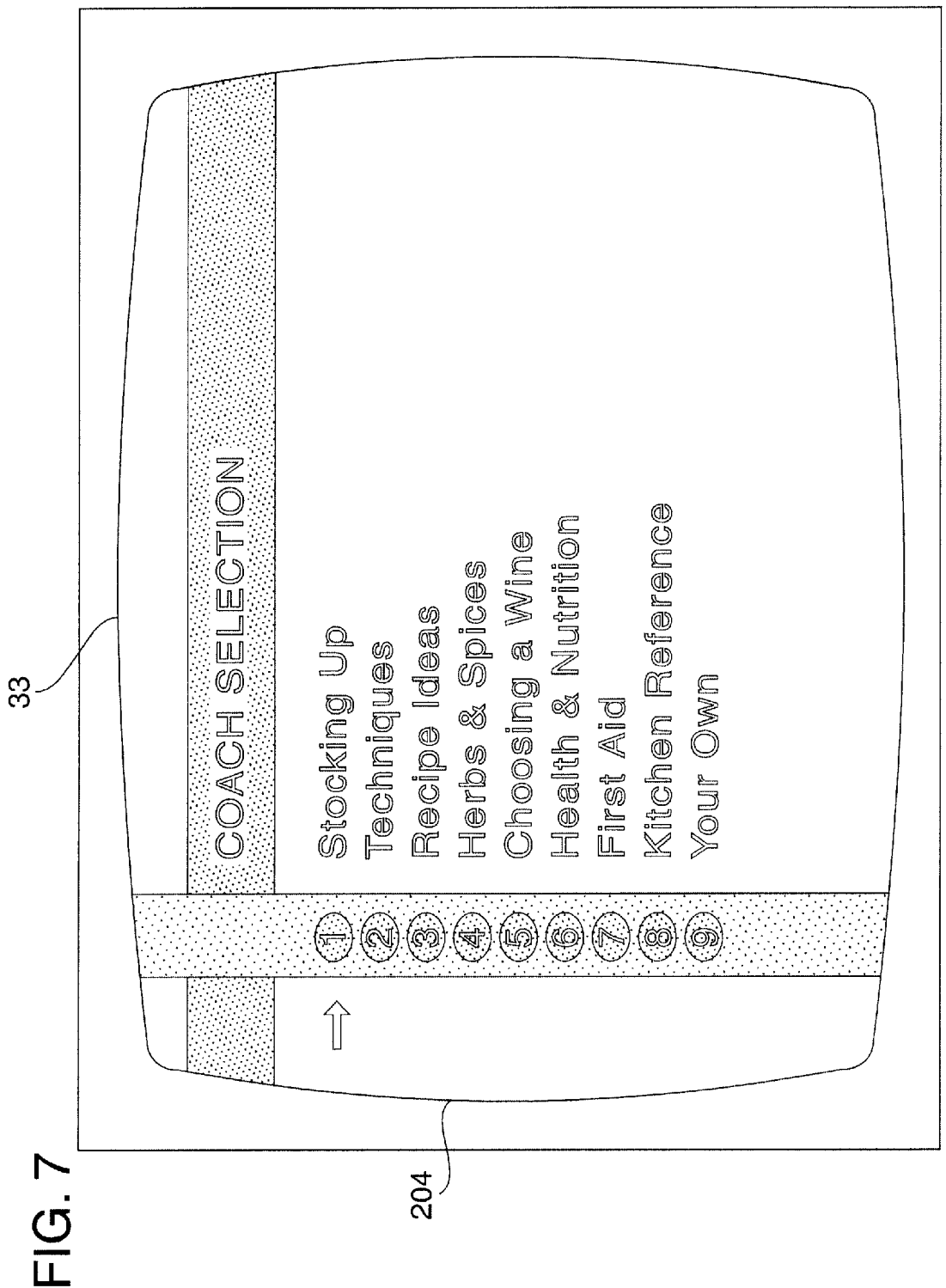
FIGS. 7–10 depict a representative set of menus and displays of information which would be displayed to a user following the FIG. 8 navigation chart to reach information of interest; in this example dry and bottled goods with which a pantry might be stocked are displayed.
Figure 8:
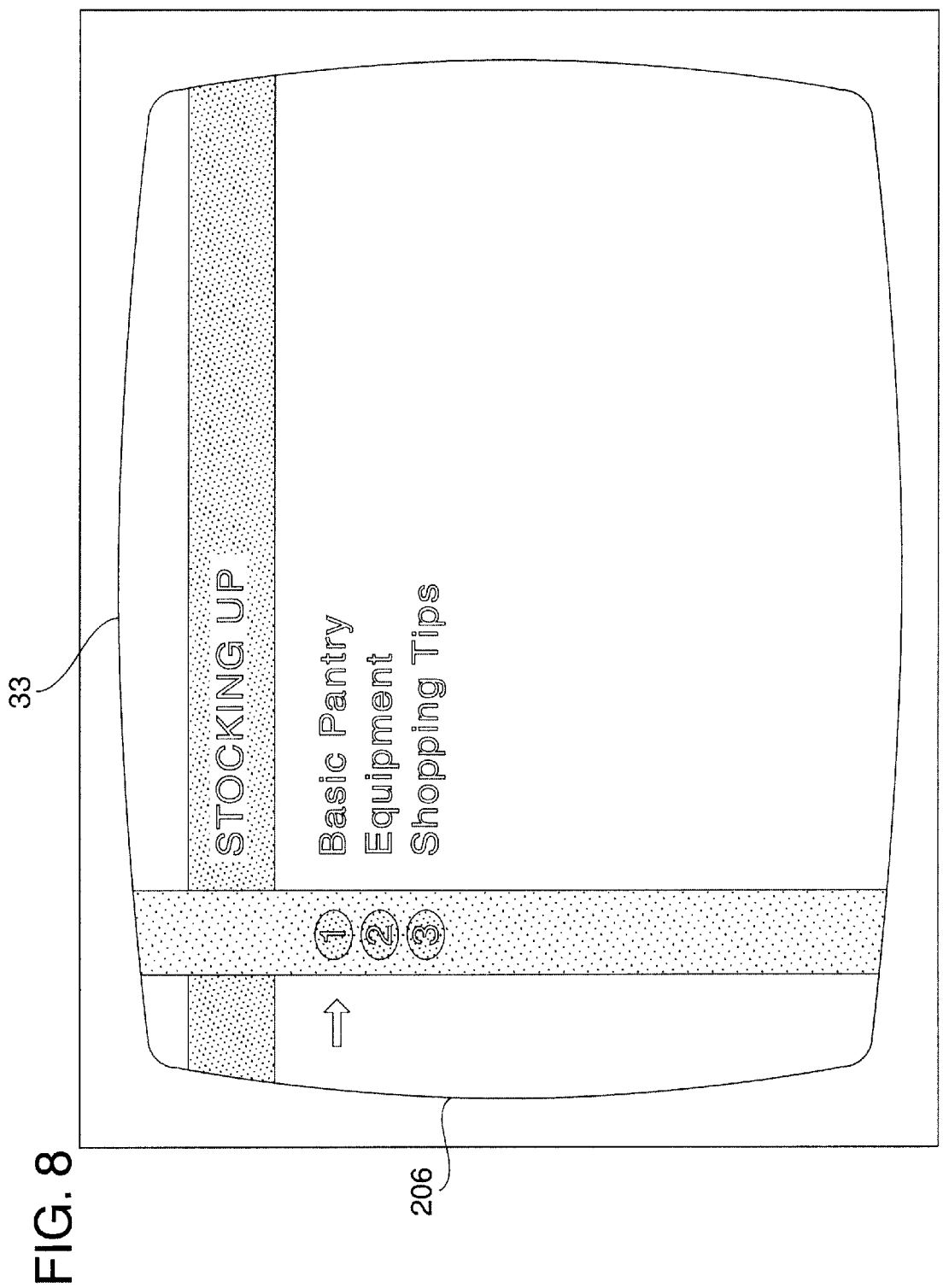

A specific example involves the retrieval of information on stocking a pantry from laser readable disk 26. The top level menu 204 is shown in FIG. 7. The user selects ① from this menu, bringing up second level menu 206 (FIG. 8). From this menu, the user selects ①. This brings up the wanted information—screen 210, FIG. 9, and screen 212, FIG. 10. In this particular example only a second level menu is accessed to retrieve the wanted information. In other instances, the wanted information may be reached directly from the top level menu 204 or from a third or lower level menu.

Remote control 24, keyboard 28, or onboard controls 38 may be used to navigate chart 202. Scroll buttons 139h (remote 24, FIG. 4) or 209 (keyboard 28, FIG. 4A) or a button of that character (not specifically shown) in the complement 38 of onboard controls can be used to move from the first screen of information 210 to the second screen 212.

RESTART, BACK, and NEXT (or FWD) buttons as described above can be used to navigate up and down the navigation chart and to return (in this typical case) to top level menu 204.

Additional information on the just-described method of retrieving information from a laser readable disk of the character disclosed herein may be found in U.S. Pat. No. 5,724,102 issued Mar. 8, 1998.

This unique feature is another one which makes system 20 easy and convenient to use and therefore acceptable to a person without technical training or inclination and with only the instruction provided by an introductory video 212 (see FIG. 6).

The remote control 28 also has the following buttons 130 and 128 employed in the CD mode of operation in retrieving selected items of information from an appropriately coded disk as follows:

FWD—advances to the next lower level of menus
PREVIOUS—returns to the preceding higher level of menus In the APPLIANCE mode of operation, GSM module 88 establishes telephonic communication between appliance 20 and a remote repair/service facility. Messages regarding problems in an appliance monitored by appliance 20 are conveyed in this manner to the remote facility.

Figure 12:
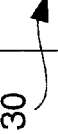
FIGS. 12–14 show pictorially a representative set of screens that might appear if one were using the FIG. 1 appliance to browse the Internet using the protocol shown in FIG. 11.
Figure 13:
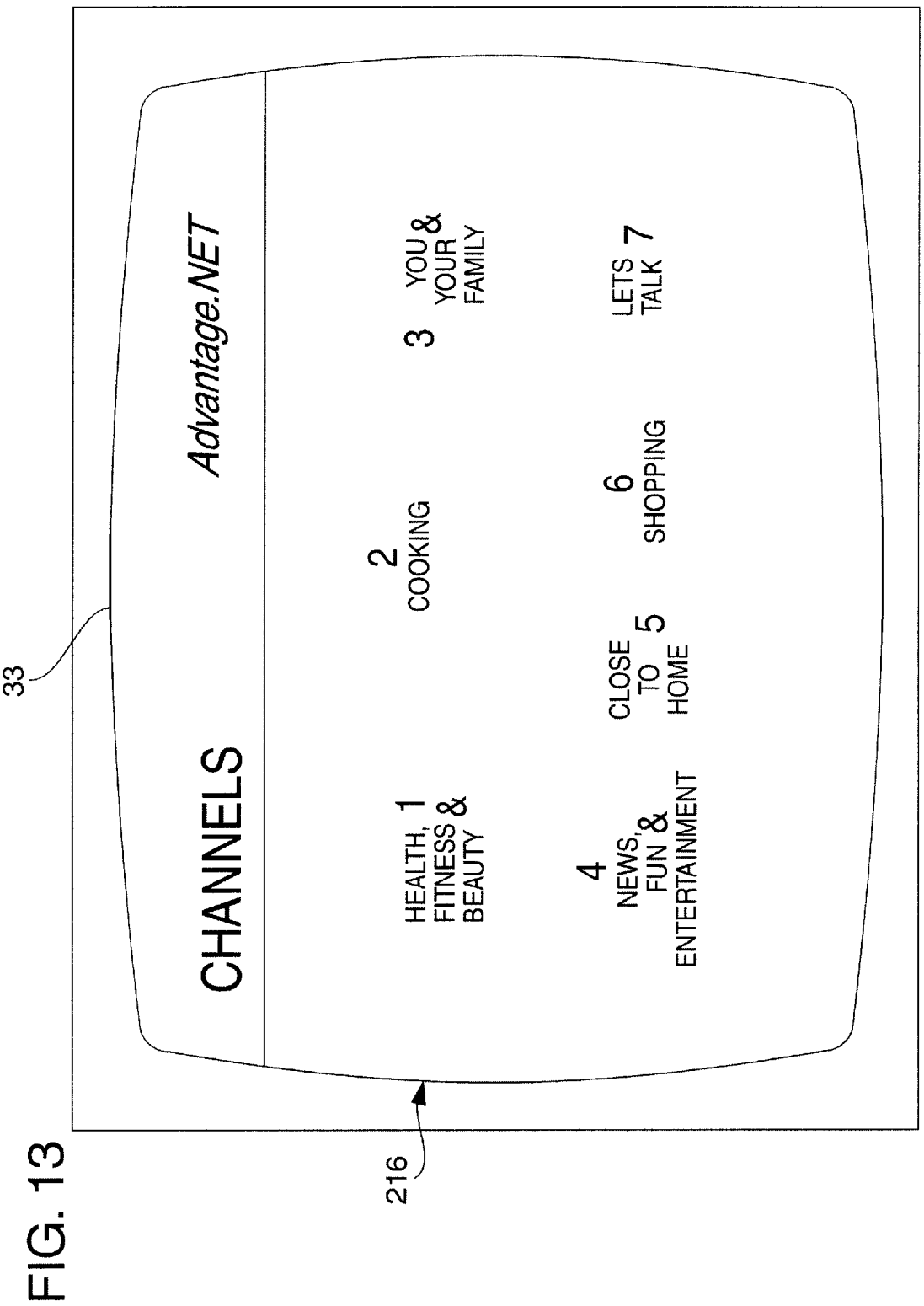
Figure 14:
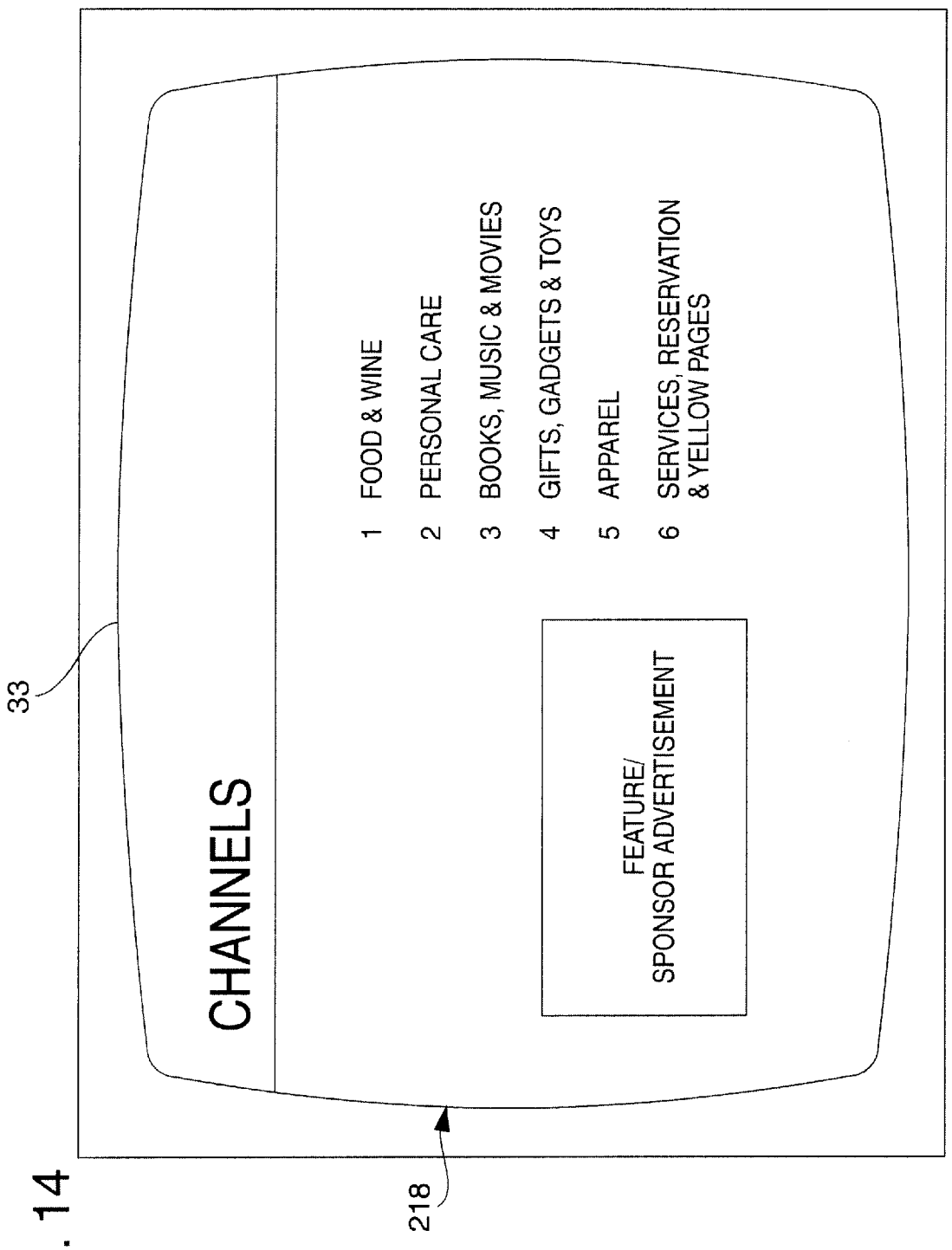

In the INTERNET mode of operation of system 20, the user can navigate through linked web site pages to information of interest. A representative set of link pages is shown in FIGS. 12, 13 and 14 and identifiably by reference character 214. Details of the illustrated hierarchy—which among other things, allows one to order groceries online—and the steps employed to reach this goal by navigation through the levels of the hierarchy with remote control 24 are described in the '947 application except that the choices on the web site pages are numbered so that they can be selected with correspondingly numbered buttons in the numerical keypad 120 of remote control 24.

Figure 11:
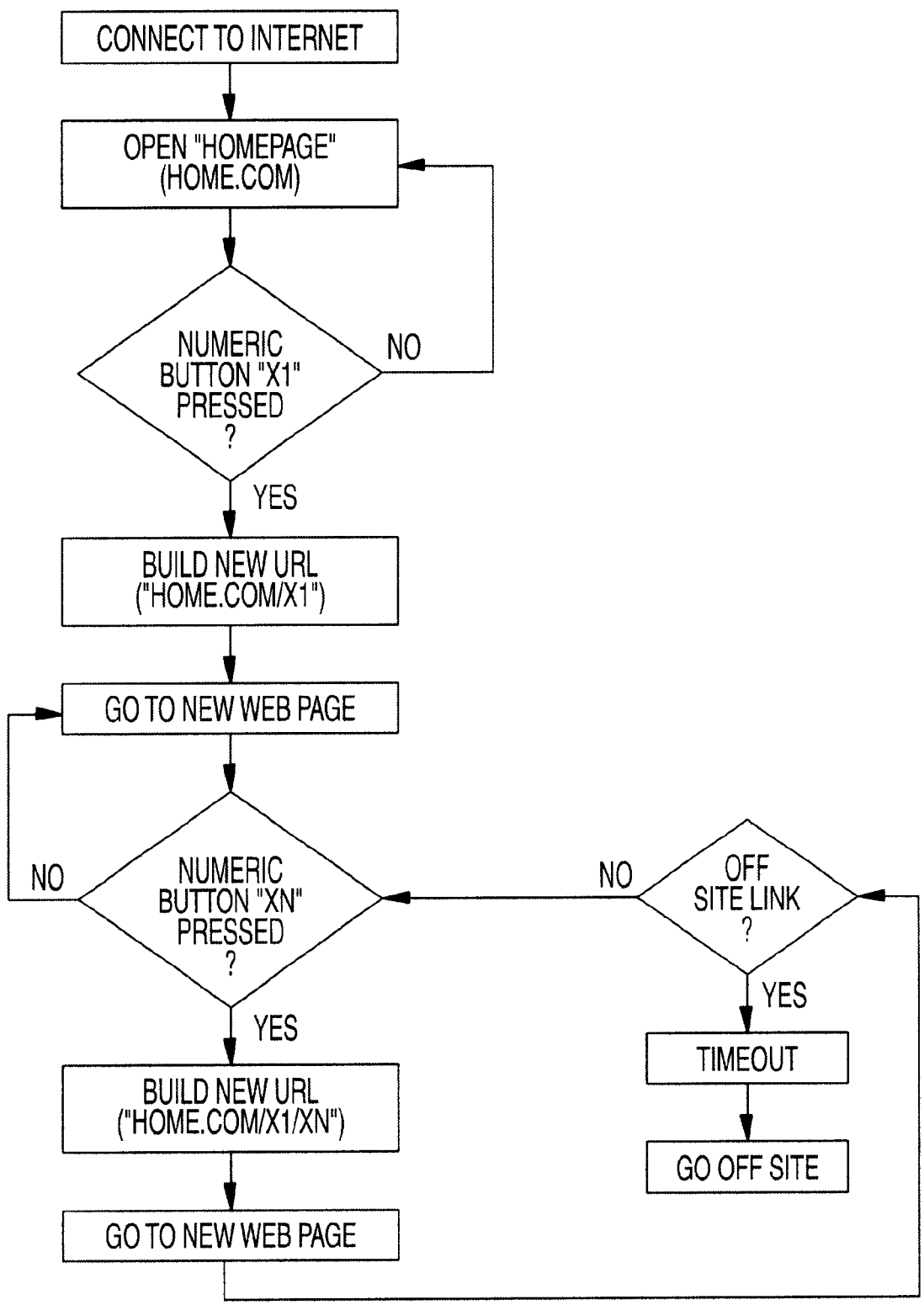
FIG. 11 shows how a user of the FIG. 1 system can browse the pages of a web site using only the remote control (or keyboard on onboard controls) of that system.

As suggested above, remote control 24 can be used to jump from the home page of an appropriate web site to the other web site pages. FIG. 11 shows how this is accomplished in one representative application of the present invention.

Remote control 24, keyboard 28, on onboard controls 38 can be employed to log onto and navigate (or browse) the Internet. First, the system user logs onto the Internet by pressing the INTERNET button 118 on remote control 24 (or NET button 166 on keyboard 28). This opens or brings up the home page 30 of the web site (see FIGS. 11 and 12). Next, the user presses numbered button ① in the numerical keypad 120 of the remote control 24. This builds a new URL, bringing up a new web page 216 (see FIG. 13).

If a number is not pressed, the operation will simply time out and return the user to home page 30 in FIG. 1.

From web page 216 in FIG. 13, the system user can jump to yet another page—e.g., the page identified in FIG. 14 by reference character 218—by pushing a different one of the ten numbered buttons in the numerical keypad 120, here push button ⑥.

In this instance, if a second numbered button is not pressed, the operation will again time out with the system user being returned to web page 216.

In one implementation, this sequence of steps can be repeated (if they are available) to bring up a maximum of ten sequentially linked pages. This limit is imposed by the number of buttons on the remote control keypad 120 and the desirability of avoiding the need to press more than one numbered button to initiate a particular action.

In another implementation, this sequence of steps can be repeated indefinitely as shown in FIGS. 11–14, as system 20 builds a URL based on the home page 30 in FIG. 12, any previously selected web pages, and the last numbered button pressed by the user that corresponds to one of the web page options displayed in association with a respective number on the currently selected web page (i.e., options 1–4 on home page 30 in FIG. 12, options 1–7 on web page 216 in FIG. 13, or options 1–6 on web page 218 in FIG. 14).

Continuing, it may be that a link selected by the system user leads to a page or web site not which is not linked to one of the web site pages 30, 216, or 218. If this happens, the operation times out; and the connection to the Internet is closed. If the link is available, the system user is instead returned to the last web site page, and the user can press a numbered button to bring up another web page.

Alternatively, if the user of appliance 20 wishes to visit a web site not linked directly or indirectly to home page 30, the user simply uses keyboard 28 to type the URL of the wanted web site and presses GO button 220 (FIG. 4A) to jump to the web site. Other linked sites can be reached by using UP, DOWN, LEFT, and RIGHT buttons 222 . . . 228 place cursor 139e (FIG. 1) on a selected link and then pressing the GO button 230 to bring up the selected link.

Figure 5:
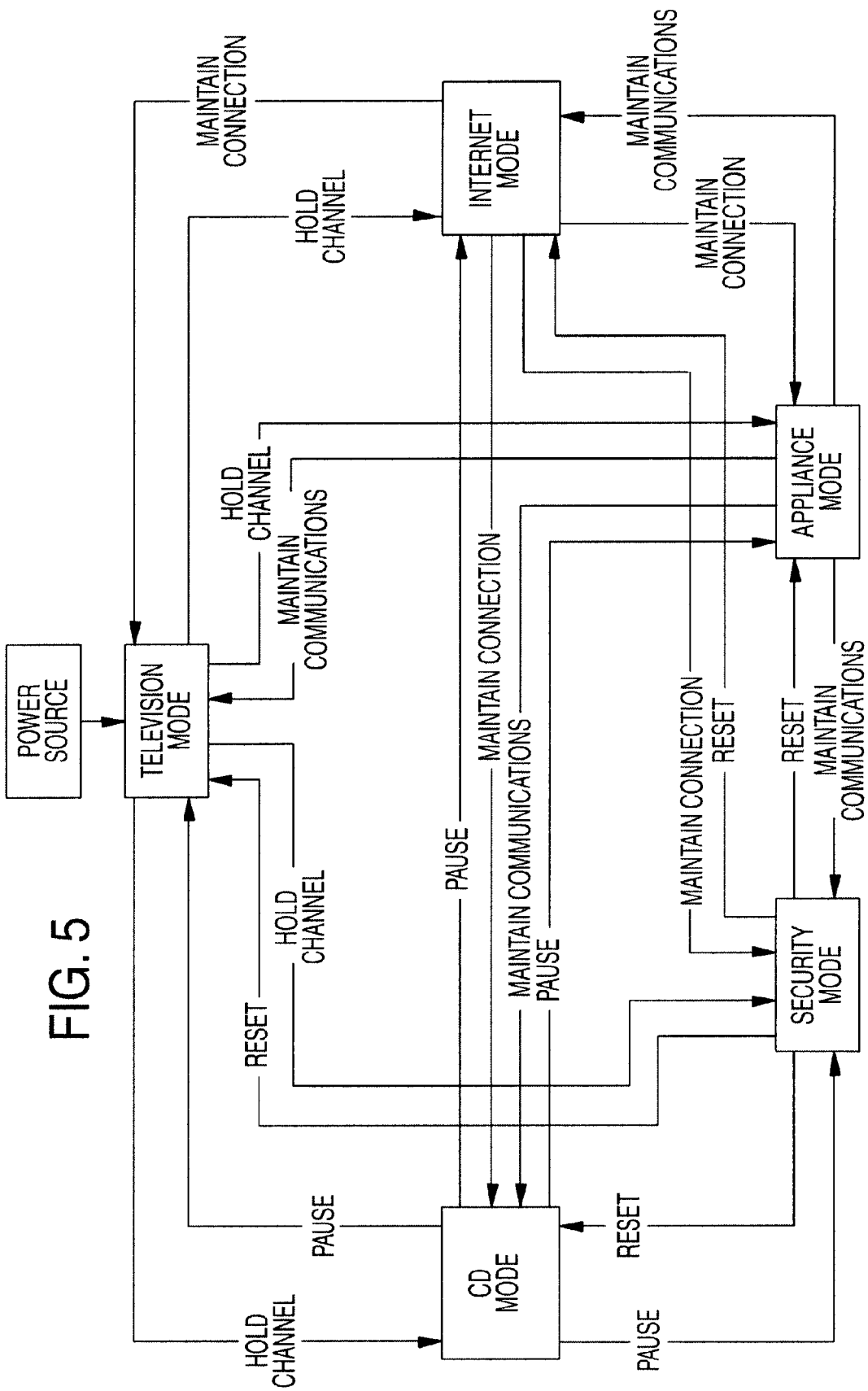
FIG. 5 shows, diagrammatically, what happens when the appliance of FIG. 1 is switched from one of its operating modes to a different one of those modes.

Another important feature of the present invention is that appliances embodying the principles of the present invention allow the system user return to where he was in a particular operating mode if he switches from that mode to another mode (or series of modes) and then back to the first mode. This additional novel, and important, operating feature invention is depicted in graphic form in FIG. 5 and elaborated upon in the following table:

| Mode Switch | |
|---|---|
| TELEVISION to CD, SECURITY, APPLIANCE, or INTERNET | The current television channel is held and will be reverted to when the TELEVISION mode is re-entered |
| CD to TELEVISION, INTERNET, APPLIANCE, or SECURITY | The disk player 34 enters a pause state, which is akin to the like named state of a conventional disk player. Rotation of the disk being played is suspended until the CD mode is re-entered. At that point, the spinning of the disk resumes, and the retrieval of data from the disk picks up from where it left off when the CD mode was exited. |
| INTERNET to TELEVISION, CD, APPLIANCE or SECURITY | The connection to the Internet is maintained, and the display present on screen 32 when the INTERNET mode was exited will reappear when that mode is reentered. |
| APPLIANCE to TELEVISION, CD, INTERNET, or SECURITY | Any active communication links to appliance 20 or to a remote facility such as a service or repair facility. |
| SECURITY to TELEVISION, CD, INTERNET, or APPLIANCE | The SECURITY/MONITOR mode is initialized, awaiting the ringing of a doorbell. |

The foregoing is not to be interpreted to mean that novel and important advantage of appliance 20 (and other appliances involving the principles of the present invention) can be obtained only if operation is switched from a first to a second mode and then back to the first mode. The appliance will operate as described no matter how many mode changes are made before the exited mode is reentered.

It is also to be understood that, to meet the needs of a particular market, one or more of the five operating modes of system 20 can be disabled. Disabled modes can be enabled as disclosed in copending provisional application No. 60/115,008 filed Jan. 6, 1999, which is hereby incorporated by reference.

The following patent documents referred to above are hereby incorporated in this disclosure by reference thereto:

U.S. Pat. No. 5,724,102 issued Mar. 3, 1998.

U.S. Pat. No. 5,801,784 issued Sep. 1, 1998.

As will be apparent to the reader, the invention may be embodied in specific forms in addition to those discussed above without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. An appliance system comprising:

a web site operably connected to the Internet, the web site having a plurality of web pages, a first of the web pages having a user-selectable option that is not a hypertext link for accessing a second of the plurality of web pages, the user-selectable option being associated with a respective one of a plurality of symbols;

an appliance unit having a display and having a plurality of operational modes including an INTERNET mode of operation; and an input device having a user-selectable mode control operably configured to prompt said appliance unit to be in the INTERNET mode and a plurality of user-actuatable controls; each actuatable control operably configured to communicate a respective one of the plurality of symbols to said appliance unit;

the appliance having a means for connecting to the Internet when prompted to be in the INTERNET mode, a means for displaying the first of the plurality of web pages when in the INTERNET mode such that the user-selectable option of the first web page is displayed in association with the respective one of the plurality of symbols, and a means for building a request for the second web page in an Internet recognizable format based upon the respective one of the plurality of symbols associated with the user-selectable option of the first web page.

2. The appliance system as defined in claim 1 wherein the plurality of symbols correspond to a plurality of numbers.

3. The appliance system as defined in claim 1 in which the plurality of symbols correspond to a plurality of alphabetical characters.

4. The appliance system as defined in claim 1, wherein the input device is a remote control and the user-selectable mode control is one of a plurality of user-selectable mode controls operably configured to prompt the appliance unit to be in a respective one of the plurality of operational modes.

5. The appliance system as defined in claim 1 in which the input device is a keyboard that has a plurality of infrared signal transmitters for wireless communication to the appliance unit, and the appliance unit has an infrared signal receiver for wireless communication from the keyboard, wherein the keyboard has a plurality of sides and each of the plurality of infrared signal transmitters is disposed on a respective one of the plurality of sides of the keyboard such that a signal transmitted from the keyboard is received by the appliance unit without regard to the orientation of the keyboard relative to the infrared signal receiver of the appliance unit.

6. The appliance system as defined in claim 1 wherein the first web page is a home page of the web site, and the input device has a home control operably configured towards prompting the appliance unit to display the home page when in the INTERNET mode.

7. The appliance system as defined in claim 6, wherein:

the appliance unit includes a disc player;

the plurality of operational modes includes a CD mode of operation; and the home control of the input device is operably configured towards prompting the appliance unit when in the CD mode to return the disc player to a starting position in relation to a disc in the disc player.

8. The appliance system as defined in claim 1, wherein the web site is hosted on the appliance unit.

9. The appliance system as defined in claim 1 wherein:

the user-actuable controls correspond to a numeric keypad of the input device, the numeric keypad having controls (0) through (9) that correspond to the plurality of symbols; and the first web page has a maximum number of user-selectable options for accessing a corresponding number of the plurality of web pages such that each web page accessed via a respective one of the number of user-selectable options can be re-accessed by pressing a corresponding numeric keypad control.

10. The appliance system as defined in claim 1, wherein the building means builds a URL for the other web page based upon the respective one of the plurality of symbols associated with the user-selectable option of the first web page.

11. The appliance system as defined in claim 10, wherein the second of the web pages has a different user-selectable option that is not a hypertext link for accessing a third of the plurality of web pages, the user-selectable option of the at least one web page being associated with a respective one of a plurality of symbols;

the building means builds a URL for the other web page based upon the respective one of the plurality of symbols associated with the at least one user-selectable option of the first web page.

12. The appliance system as defined in claim 1, wherein the appliance unit includes a disc player;

the plurality of operational modes includes a CD mode of operation; and the input device has a stop control operably configured towards prompting the appliance unit to stop an operation in progress when in the INTERNET mode and operably configured towards prompting the appliance unit to stop reading a disc in the disc player when in the CD mode.

13. An appliance system, comprising:

an integrated unit having a display, a disc player, and a control module operably connected to the display and the disk player, the control module having a plurality of modes of operation including a TV Mode, a CD Mode, an Appliance Mode, a Security Mode, and an Internet Mode;

a plurality of switches, each switch operably configured to prompt the control module to switch to a respective one of the plurality of modes, the control module of the integrated unit operably configured so that operation of the integrated unit in an active one of the modes is saved at a point when the integrated unit is switched to another of the modes, the control module is further configured so that operation of the integrated unit is resumed at the same point when the integrated unit is switched back to the active one mode;

a camera disposed to view an area; and a sensor disposed in the area to detect the presence of a person in the area, wherein the camera and sensor are both operably connected to the control module, the control module is operably configured to display the area in view of the camera when in Security Mode and to automatically switch to the Security Mode in response the sensor detecting a person in the area in view of the camera, wherein the sensor is a doorbell disposed in proximity to a doorway, the area in view of the camera is the doorway, and the control module is operably configured to automatically switch to the Security Mode when the control module is in any of the other modes of operation.

14. The appliance system as defined in claim 13, further comprising a keyboard operably configured for wireless communication with the control module, the keyboard incorporating the plurality of switches.

15. The appliace system as defined in claim 13, wherein the control module is operably configured to establish a communication link to the appliance when in the Appliance mode and to maintain the communications link when the control module is switched to one or more of the plurality of modes.

16. The appliance system as defined in claim 15, wherein the communications link is between the appliance and a remote service facility.

* * * * *